United States Patent [19]
Kobayashi et al.

[11] Patent Number: 5,824,421
[45] Date of Patent: Oct. 20, 1998

[54] OIL- AND WATER-REPELLENT COATING COMPOSITION

[75] Inventors: Hideki Kobayashi; Toru Masatomi, both of Chiba, Japan

[73] Assignee: Dow Corning Toray Silicone Co., Ltd., Tokyo, Japan

[21] Appl. No.: 741,271

[22] Filed: Oct. 30, 1996

[30] Foreign Application Priority Data

Nov. 28, 1995 [JP] Japan .................................. 7-334049

[51] Int. Cl.$^6$ ........................... B32B 9/04; C09D 133/00; C09D 169/00; C09D 183/04
[52] U.S. Cl. ........................... 428/447; 428/412; 428/451; 525/54.2; 525/54.4; 525/100; 525/104; 525/105; 525/168; 525/403; 525/464; 525/476
[58] Field of Search .................................... 428/412, 447, 428/451; 525/54.21, 54.4, 100, 104, 105, 168, 403, 464, 476

[56] References Cited

U.S. PATENT DOCUMENTS

| | | | |
|---|---|---|---|
| 4,795,783 | 1/1989 | Hunt | 525/101 |
| 4,980,440 | 12/1990 | Kenziorski et al. | 528/15 |
| 5,457,158 | 10/1995 | Caporiccio et al. | 525/102 |

FOREIGN PATENT DOCUMENTS

| | | |
|---|---|---|
| 0145308 | 6/1985 | European Pat. Off. . |
| J59-121624 | 7/1984 | Japan . |
| J63-142024 | 6/1988 | Japan . |
| 2/652 | 1/1990 | Japan . |
| J04025581 | 1/1992 | Japan . |
| 6/68096 | 8/1994 | Japan . |
| 7/45586 | 5/1995 | Japan . |

OTHER PUBLICATIONS

European Search Report, Apr. 28, 1997.

*Primary Examiner*—D. S. Nakarani
*Attorney, Agent, or Firm*—Arne R. Jarnholm

[57] ABSTRACT

Condensation-curable coating compositions are prepared from a mixture of and organic resin (A) and a flurosilicone (B). Water or an organic solvent may be used to provide a vehicle for application of the composition. The cured coatings of the invention exhibit superior water and oil repellency.

5 Claims, No Drawings

OIL- AND WATER-REPELLENT COATING COMPOSITION

BACKGROUND OF THE INVENTION

1. Field of the Invention

The present invention relates generally to coating compositions adapted for application to various substrates, and more particularly to fluorosilicone coating compositions that form films having excellent water and oil repellency.

2. Description of the Prior Art

Organic resin coating agents containing silicone are known in the art. For instance, coating compositions adapted for metal substrates are disclosed in Japanese Kokoku Patent No. Hei 6[1994]-68096 which comprise the hydrolysis-condensation products of an organotrialkoxysilane and acrylic polymer. In Japanese Kokai Patent Application No. Hei 2[1990]-652, coating compositions comprising the hydrolysis-condensation products of an organotrialkoxysilane and phenolic resin are proposed. However, the water and oil repellency of these coating materials are unsatisfactory.

Japanese Kokoku Patent No. Hei 7[1995]-45586 discloses that after forming a protective film made of hydrolysis-condensation products of an organotrialkoxysilane on the surface of a plastic molding, treated with a gaseous perfluoroalkyl-group-containing organosilane, resulted in a plastic molding with excellent water repellency and oil repellency. However, this method consists of a two-step surface treatment so it is complex. Therefore, there is a need for coating material that can exhibit both water repellency and oil repellency simply by coating and curing.

SUMMARY OF THE INVENTION

The composition of the present invention overcomes the drawbacks of the prior in that upon curing the same, it is provides a film having excellent water repellency and oil repellency, without the need for a subsequent treatment. Accordingly, these properties can be imparted to a variety of substrates.

In accordance with the invention, there is provided a coating composition comprising:
(A) 100 parts by weight of an organic resin;
(B) 0.01–50 parts by weight of a fluorosilicone having the empirical formula:

wherein $R^1$ is an alkylene group or alkyleneoxyalkylene group, each $R^2$ is independently an alkyl group or aryl group, a is an integer of 4 or greater, b is 0–2, c is 0–3, n is a number greater than 0, and m is 0 or greater; and
(C) optionally, a diluent selected from the group consisting of organic solvents and water.

DETAILED DESCRIPTION OF THE INVENTION

The organic resins (A) used in the coating composition of the present invention may be any conventional coating agent, such as a thermoplastic organic resin and thermosetting organic resin, but not a silicone resin. Accordingly, as used herein, the term "organic resin" specifically excludes silicone resins.

Examples of suitable thermoplastic organic resins include vinyl chloride resins such as poly(vinyl chloride) and vinyl chloride-vinyl acetate copolymer; vinylidene chloride resins such as poly(vinylidene chloride), vinylidene chloride-vinyl chloride copolymer, vinylidene chloride-acrylonitrile copolymer, vinylidene chloride-acrylic acid ester copolymer, and vinylidene chloride-maleic acid ester copolymer; vinyl acetate resins such as poly(vinyl acetate) and vinyl acetate-methyl methacrylate copolymer; poly(vinyl alcohol); poly(vinyl acetals) such as poly(vinyl formal), poly(vinylacetoacetal), and poly(vinyl butyral); poly(vinyl ethers) such as poly(vinyl methyl ether), poly(vinyl ethyl ether), poly(vinyl isobutyl ether), vinyl methyl ether-maleic anhydride copolymer, and vinyl methyl ether-cyclopentadiene copolymer; acrylic resins or methacrylic resins such as poly(methyl methacrylate), methyl methacrylate-styrene copolymer, poly(acrylonitrile), and poly(acrylic acid ester); styrene resins such as polystyrene and styrene-butadiene-acrylonitrile copolymer; polyethylene; polypropylene; ethylene-propylene copolymer; polyamides; fluororesins such as poly(tetrafluoroethylene), poly (chlorotrifluoroethylene), poly(vinyl fluoride), poly (vinylidene fluoride), tetrafluoroethylene-hexafluoropropylene copolymer, and trifluoroethylene-vinyl chloride copolymer; polycarbonates; chlorinated polyethers such as polyether, Delrin™, Celcon™, chlorinated polyether, and acetal resins; coumarone-indene resin; and petroleum resins.

Examples of suitable thermosetting organic resins include phenolic resins; urea resins such as butylurea resin; melamine resins such as butylated melamine resin; guanamine resins such as methylated benzoguanamine and butylated benzoguanamine; furan resins such as phenol-furfural resin and furfuryl alcohol resin; unsaturated polyester resins; epoxy resins; polyurethane resins; xylene resins such as phenol-modified xylene resin and rosin modified xylene resin; toluene resins; and alkyd resins.

In addition to the above resins, suitable synthetic resins for component (A) include aminoalkyd resins such as urea-alkyd resin, melamine-alkyd resin, urea-melamine-alkyd resin, and benzoguanamine-alkyd resin; modified alkyd resins such as styrene-substituted alkyd resin, rosin-modified alkyd resin, phenol-alkyd condensation product, epoxy-modified alkyd resin, and acrylic-modified alkyd resin; vinyl sol products such as vinyl chloride plastisol and vinyl chloride organosol, and modified epoxy resins such as epoxy-phenol resin, epoxy-amino resin, epoxy-alkyd-melamine resin, epoxy-ester resin, epoxy-isocyanate resin, and epoxy-acrylic resin.

Further resins that are suitable as component (A) include cellulose derivatives such as cellulose acetate, cellulose acetate butyrate, nitrocellulose, cellulose propionate, and ethylcellulose; rubber derivatives such as chlorinated rubber, hydrochlorinated rubber, and cyclized rubber; natural starting material such as Japanese lacquer and casein; polyesters such as poly(ethylene terephthalate); rosin esters such as ester gum; diallyl phthalate resin; polyimide resins; rosin; penta resin (the reaction product of pentaerithritol and rosin); maleic acid resin; and amino resins can be used.

Above all, thermoplastic organic resins are preferable. If transparency is especially required, acrylic resins, methacrylic resins, and polycarbonates are preferable.

The fluorosilicone (B) used in the composition of the present invention is of the empirical formula:

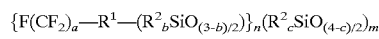

wherein $R^1$ is an alkylene group or alkyleneoxyalkylene group, each $R^2$ is independently an alkyl group or aryl group, a is an integer of 4 or greater, b is 0–2, c is 0–3, n is a number greater than 0, and m is 0 or greater.

Representative examples of $R^1$ alkylene groups include the ethylene group, methylethylene group, ethylethylene group, propylethylene group, butylethylene group, propylene group, butylene group, 1-methylpropylene group, pentylene group, hexylene group, heptylene group, octylene group, nonylene group, and decylene group.

Representative examples of $R^1$ alkyleneoxyalkylene groups include the ethyleneoxyethylene group, ethyleneoxypropylene group, ethyleneoxybutylene group, propyleneoxyethylene group, propyleneoxypropylene group, propyleneoxybutylene group, butyleneoxyethylene group, and butyleneoxypropylene group.

Representative examples of $R^2$ alkyl groups include the methyl group, ethyl group, propyl group, butyl group, pentyl group, hexyl group, heptyl group, octyl group, nonyl group, decyl group, hexadecyl group, and octadecyl group.

Representative examples of $R^2$ aryl groups include the phenyl group, tolyl group, and xylyl group.

In the above formula, a is an integer of 4 or greater, preferably 4–12, and more preferably 4, 6, or 8. Likewise in the above formula, b is an integer from 0–2, c is an integer from 0–3; n is greater than 0; and m is 0 or greater. It is preferable that ratio m/n is from 0–200.

The structure of (B) the fluorosilicone of the present invention can be a straight chain, branched-chain-containing a straight chain, net shaped, or 3-dimensional structure. It is, however, preferable to use a siloxane unit that can be expressed by $$F(CF_2)_a-R^1-SiO_{3/2}$$

wherein $R^1$ is an alkylene group or alkyleneoxyalkylene group and a is 4 or greater, in the molecule.

The softening point of the fluorosilicone (B) is preferably 30° C. or higher, more preferably 50°–250° C. When the fluorosilicone has a straight chain structure and a softening point of 30° C. or greater, it is preferable that 10 mol % or greater of the $R^2$ is an aryl group such as a phenyl group.

The fluorosilicone (B) of the present ingredient can be prepared by hydrolyzing a perfluoro group-containing organosilane that can be expressed by the general formula $$F(CF_2)_a-R^1-(R^2_bSiX_{3-b})$$

wherein $R^1$, $R^2$, a, and b are the same as those mentioned above, X is a halogen atom such as chlorine and bromine or an alkoxy group such as a methoxy group, ethoxy group, propoxy group, and butoxy group, followed by a condensation reaction.

Another method of preparing the fluorosilicone (B) of the invention involves the cohydrolysis of the perfluoro-group-containing organosilane of the above-mentioned general formula and an organosilane that can be expressed by the general formula $$R^2_cSiX_{(4-c)}$$

wherein $R^2$, X, and c are the same as those mentioned above, in the presence of an organic solvent and an aqueous acidic solution, followed by a condensation reaction.

Methods for aforementioned cohydrolysis include (1) dissolving a mixture of the silanes of the above-mentioned general formulas in an organic solvent, thereafter making dropwise addition of the same into an aqueous acidic solution with stirring or (2) stirring the organic-solvent-containing solution while adding an aqueous acidic solution to it. The organic solvent used is preferably one that can dissolve the above-mentioned silanes as well as the formed fluorosilicone formed therefrom. Thus, examples of suitable solvents include ethers such as diethyl ether and tetrahydrofuran; ketones such as acetone and methyl isobutyl ketone; fluorine-containing solvents such as a,a,a-trifluorotoluene and hexafluoroxylene; and volatile silicone solvents such as hexamethyldisiloxane, hexamethylcyclotrisiloxane, and octamethylcyclotetrasiloxane. The concentration of the above-mentioned silane in an organic solvent is preferably such that the concentration of the fluorosilicone formed therefrom is 10–80 wt %.

Suitable examples of the above-mentioned aqueous acidic solution include aqueous solutions of sulfuric acid, nitric acid, and hydrochloric acid. Above all, an aqueous solution of hydrochloric acid is preferable, in which case it is necessary that the hydrogen chloride is 5 wt % or greater.

The temperature of the reaction mixture during and after the dropwise addition is preferably maintained between 0°–120° C.

If necessary, an organic solvent or water may be added to the fluorosilicone solution thus obtained which, upon standing, forms seperate aqueous and solvent layers. After the separation of the aqueous layer, the fluorosilicone-containing organic solvent layer is washed with water until the organic solvent layer is neutral. It is preferable to further dewater solvent phase. The dewatering can be carried out under the co-boiling (azeotropy) of the organic solvent using a water-separating column. The organic solvents that are preferably used are those having a low solubility in water. The fluorosilicone thus obtained contains a certain amount of residual silanol group and alkoxy group and its amount is usually 0.01–10 wt %, preferably 0.05–5 wt %.

The amount of flurosilicone (B) used in the composition of the invention is 0.01–50 parts by weight, preferably 0.02–20 parts by weight, per 100 parts by weight of organic resin (A). If (B) is less than 0.01 part by weight, the water repellency of the cured coating is unsatisfactory. If more than 50 parts by weight (B) is used, the physical properties of the cured film become inferior.

Examples of the fluorosilicone of the present ingredient include compounds that can be represented by the following average unit formulas:

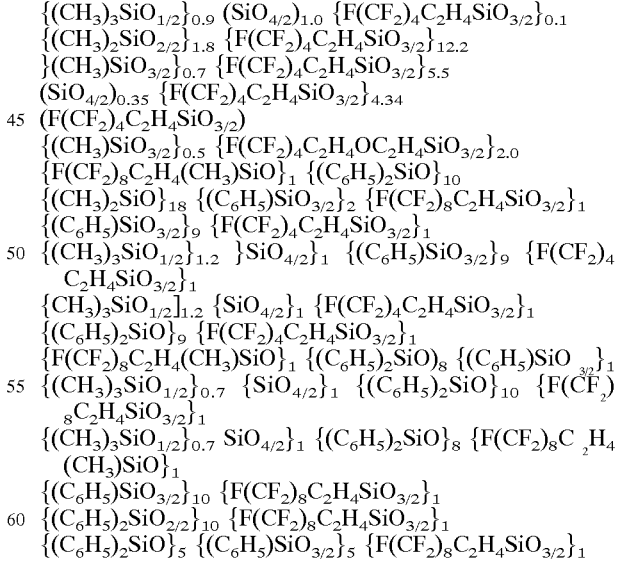

An organic solvent or water, ingredient (C), is optionally used in the composition of the present invention is an to dilute the organic resin (A). While it is preferable that the organic resin (A) be used in form of a solution, a dispersion or suspension of same in an aqueous or organic solvent dispersant can also be used. Examples of suitable organic solvents used in concetion with the organic resin (A) include aromatic hydrocarbons such as benzene, toluene, and xylene; aliphatic hydrocarbons such as pentane, hexane, and heptane; alicyclic hydrocarbons such as cyclohexane, cycloheptane, and cyclooctane; halogenated hydrocarbons such as chlorobenzene, perhcloroethylene, trifluoromethylbenzene, 1,3-bis(trifluoromethyl)benzene, and methylpentafluorobenzene; esters such as ethyl acetate and butyl acetate; ketones such as acetone, methyl ethyl ketone, and methyl isobutyl ketone; ethers such as dimethyl ether, diethyl ether, and tetrahydrofuran; and alcohols such as methanol, ethanol, and isopropyl alcohol.

The organic solvent used with the organic resin (A) in the solution or dispersion, is to control viscosity, but usually it is 1–10,000 parts by weight, preferably 10–1,000 parts by weight, based on 100 parts by weight of ingredient (A).

In additition to the above-mentioned ingredients (A)–(C), the composition of the present invention may include a silane coupling agent to improve the adhesion of the composition to various substrates. Likewise, a curing catalyst for improving the curability of the composition may be added, as long as it does not impair the objective of the present invention.

Examples of silane coupling agents that can be used in connection with the compositions of the invention include compounds of the following formulas:

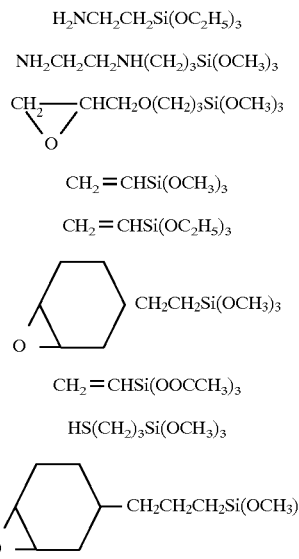

One or more coupling agents may be used in the coating compositions of the invention, the total amount being between about 0.01–10 wt % of the composition.

Curing catalysts which promote condensation cure are feectively used in connection with the composition of the invention. Examples of suitable curing catalysts include the tin salts of carboxylic acids such as dibutyltin acetate, dibutyltin laurate, dibutyltin dioctoate, stannous octoate, stannous naphthenate, stannous oleate, stannous isobutyrate, stannous linoleate, stannous stearate, stannous benzoate, stannous naphthoate, stannous laurate, stannous O-thymate [transliteration], stannous b-benzoylpropionate, stannous crotonate, stannous tropate, stannous p-bromobenzoate, stannous palmitoleate, stannous cinnamate, and stannous phenylacetate; iron salts, manganese salts, and cobalt salts of these carboxylic acids; complex salts of dialkyl titanate and tetraalkyl titanate; and organosiloxy titanate.

If desired, other additives such as a coloring material, pigment, dye, light-absorbing agent, fluorescent paint, photosensitizer, color coupler, or a filler, such as finely powdered silica, can be added to the compositions of the present invention.

The compositions of the present invention can be prepared by homogeneous mixing of the above-mentioned ingredients (A)–(C). It is preferable, however, to dilute ingredient (A) with ingredient (C), followed by adding ingredient (B).

Methods for applying the composition of the present invention to the surface of various substrates include: (1) coating using a brush, a bar coater, and a spin coater; (2) spraying; and (3) dipping a substrate in the composition of the present invention. After the surface of a substrate is coated with the composition of the invention, the organic solvent or water, ingredient (C), is removed at room temperature or with heating, such that a cured film is formed. It is preferable to heat the coated substrate at 50°–150° C. for 20 sec to 3 h so as to form the cured film.

Examples of substrates that can be coated with the compositions of the present invention include various glasses, such as soda glass, heat-ray-reflecting glass, glass for automobiles, glass for ships, and glass for aircraft; metal plates such as copper, iron, stainless steel, aluminum, and zinc; paper such as wood-free paper and kraft paper; synthetic resins such as polyesters, polycarbonates, polystyrene, acrylic resins, methacrylic resins, and nylon resins, and their films; fibers such as natural fibers and synthetic fibers; ceramics; and plastics. It is preferable that the surface of the substrate is washed with an organic solvent or a detergent beforehand.

The above-mentioned compositions of the present invention form cured films having excellent water repellency and oil repellency and exhbit low surface energy when applied to on the surface of various substrates. The cured films also exhibit excellent stain resistance, mold-releasing properties, heat resistance, weather resistance, and chemical resistance. Thus, they can be used for various purposes that require these characteristics. The compositions of the present invention can be suitably used as an adhesion inhibitor for water droplets, snow, ice, oil, thermoplastic powders, and fine powders of resins; stain-inhibitive coating material; and coating agents for peeling or mold releasing.

EXAMPLES

Application examples are presented below to illustrate the novel features and utility of the present invention. In the application examples, the water repellency of the films was evaluated by measuring the contact angle with respect to water. The oil repellency was evaluated by measuring the contact angle with respect to methylene iodide or hexadecane.

In both cases the contact angle was measured using the following method. A microsyringe was used to drop water and methylene iodide or hexadecane on 5 sites of a cured film at 20° C. The contact angle was measured using a contact-angle gauge (Kyowa Kaimenkagaku Co., Ltd.) and the average value obtained at the five sites was regarded as the contact angle for the film.

Synthesis Example 1

A mixture of 16 g of water, 12 g of isopropyl alcohol, and 70 g of 1,3-bis(trifluoromethyl)benzene were put in a flask; while the mixture was being stirred, a mixture of 114 g of nonafluorohexyltrichlorosilane of the formula $C_4F_9C_2H_4SiCl_3$ and 50 g of 1,3-bis(trifluoromethyl)benzene was added dropwise to the flask. After the addition, the resulting mixture was stirred for 2 h. It was then allowed to stand to separate into an aqueous layer and an organic solvent layer. The organic solvent layer was successively washed with pure water, a 10 wt % aqueous sodium bicarbonate solution, and pure water. After the washings, the organic solvent was removed by heating to obtain 86 g of a fluorosilicone resin of the formula $(C_4F_9C_2H_4SiO_{3/2})_x$ (wherein x is 7 on the average). The resin was a transparent colorless liquid at room temperature.

Synthesis Example 2

A mixture of 24 g of water, 18 g of isopropyl alcohol, and 70 g of 1,3-bis(trifluoromethyl)benzene was put in a flask. While the mixture was being stirred, a mixture of 23 g of hexadecafluorodecyltrichlorosilane of the formula $C_8F_{17}C_2H_4SiCl_3$, 101 g of diphenyldichlorosilane, 70 g of 1,3-bis(trifluoromethyl)benzene, and 50 g of toluene was added dropwise to the flask. After the addition, the resulting mixture was stirred for 2 h. It was then allowed to stand to separate the aqueous layer form the organic solvent layer. The organic solvent layer was successively washed with pure water, a 10 wt % aqueous sodium bicarbonate solution, and pure water. After the washings, the organic solvent was removed by heating to obtain 87 g of a fluorosilicone resin of the formula $\{C_8F_{17}C_2H_4SiO_{3/2}\}_n\{(C_6H_5)_2SiO\}_m$ (wherein n is 1 on the average and m is 10 on the average. The resin was a white solid with a softening point of 70° C.

Application Example 1

A coating composition was prepared by adding 0.1 g of the fluorosilicone resin prepared in Synthesis Example 1 to a 1:1 mixture of (1) 10 g of a toluene/butyl mixed solution of an acryl polyol resin (solids content: 50 wt %) (trade name: Acrydic A-801, Dainippon Ink and Chemicals, Inc.) and (2) 10 g of 1,3-bis(trifluoromethyl)benzene. A clean smooth glass plate was dipped for 10 min in the composition thus prepared; after 10 min the glass plate was removed from the composition and was air-dried at room temperature for 1 h. It was then heated at 150° C. for 1 h to form a film on the glass plate. The contact angle of the film thus obtained was measured and the result is reported in Table I.

Application Example 2

A coating composition was prepared as in Application Example 1, except that the amount of fluorosilicone resin (prepared in Synthesis Example 1) used in Application Example 1 was changed to 0.2 g. The composition was then coated on a glass plate and dried and heat-cured as aboveto form a film. The contact angle of the film was measured and the result is shown in Table I.

Comparative Example 1

A coating composition was prepared as in Application Example 1, except that the fluorosilicone resin (prepared in Synthesis Example 1) as in Application Example 1 was not used. The composition was then coated on a glass plate and dried and heat-cured as above to form a film. The contact angle of the film was measured and the result is shown in Table I.

TABLE 1

| | Contact Angle | |
|---|---|---|
| | Water | Methylene Iodide |
| Application Example 1 | 100 | 68 |
| Application Example 2 | 107 | 67 |
| Comparative Example 1 | 85 | 33 |

Application Example 3

A coating composition was prepared by adding 1 g of the fluorosilicone resin synthesized in Synthesis Example 2 to 20 g of a tetrahydrofuran solution of a polycarbonate resin (solids content: 10 wt %). A clean smooth glass plate was coated with the composition thus prepared in such a way that the amount coated was 300 g/m$^2$; it was then air-dried at room temperature for 1 h. This was heated at 150° C. for 1 h to form a film on the glass plate. The contact angle of the film thus obtained was measured and its external appearance was visually evaluated. The results are shown in Table II.

Comparative Example 2

A coating composition was prepared as in Application Example 3 except that the fluorosilicone resin (prepared in Synthesis Example 2) was not used as in Application Example 3. The composition was coated on a glass plate and dried and heat-cured as above to form a film. The contact angle of the film was measured and its external appearance was visually evaluated. The results are shown in Table II.

Comparative Example 3

A coating composition was prepared as in Application Example 3, except that the fluorosilicone resin (prepared in Synthesis Example 2 used in Application Example 3) was replaced by a methylsilicone resin (trade name: SH2400, Dow Corning Toray Silicone Co., Ltd.). The composition was coated on a glass plate and dried and heat-cured as above to form a film. The contact angle of the film was measured and its external appearance was visually evaluated. The results are shown in Table II.

Comparative Example 4

A coating composition was prepared as in Application Example 3, except that the fluorosilicone resin (prepared in Synthesis Example 2) was replaced by a phenylmethylsilicone resin (trade name SH804, Dow Corning Toray Silicone Co., Ltd.). The composition was coated on a glass plate and dried and heat-cured as above to form a film. The contact angle of the film was measured and its external appearance was visually evaluated. The results are shown in Table II.

TABLE II

| | Contact Angle | | External Appearance |
|---|---|---|---|
| | Water | Hexadecane | of Film |
| Application Example 3 | 108.0 | 54.3 | Transparent |
| Comparative Example 2 | 87.0 | 10 and below | Transparent |
| Comparative Example 3 | 99.2 | 29.2 | White Turbidity |
| Comparative Example 4 | 92.7 | 19.2 | Transparent |

The novel compositions of the present invention, as well as various advantages and features thereof, have been illus-

What is claimed is:

1. A curable coating composition comprising:
(A) 100 parts by weight of an organic resin; and
(B) 0.01–50 parts by weight of a fluorosilicone having the empirical formula:

$$\{F(CF_2)_a\text{—}R^1\text{—}(R^2_bSiO_{(3-b)/2})\}_n(R^2_cSiO_{(4-c)/2})_m$$

wherein $R^1$ is an alkylene group or alkyleneoxyalkylene group, each $R^2$ is independently an alkyl group or aryl group, a is an integer of 4 or greater, b is 0–2, c is 0–3, n is a number greater than 0, and m is 0 or greater.

2. A composition in accordance with claim 1 further comprising (C) a diluent selected from the group consisting of water and organic solvents.

3. A composition in accordance with claim 1 wherein said organic resin is a thermoplastic organic resin.

4. A composition in accordance with claim 1 wherein said organic resin is a thermosetting organic resin.

5. An article of manufacture comprising a substrate presenting at least one surface and said at least one surface being coated with the cured composition of claim 1.

* * * * *